United States Patent [19]

Faulkner et al.

[11] Patent Number: 4,645,071
[45] Date of Patent: Feb. 24, 1987

[54] IDLER ROLL ASSEMBLY

[75] Inventors: Danny E. Faulkner, Atlanta; William R. Little, Decatur, both of Ga.

[73] Assignee: Alpha Manufacturing, Inc., Tucker, Ga.

[21] Appl. No.: 653,137

[22] Filed: Sep. 24, 1984

[51] Int. Cl.$^4$ .............................................. B65G 39/10
[52] U.S. Cl. ..................................... 198/842; 193/37
[58] Field of Search .............. 198/842, 843, 780, 957, 198/781; 29/132; 474/190, 191; 193/37, 35 R

[56] References Cited

U.S. PATENT DOCUMENTS

| | | | |
|---|---|---|---|
| 1,569,393 | 1/1926 | Rathers | 474/191 |
| 3,563,721 | 2/1971 | Ritter, Jr. | 198/781 |
| 4,053,039 | 10/1977 | Shuttleworth | 198/780 |

OTHER PUBLICATIONS

Newman Industries Inc., Newmite Rollers for Belt and Gravity Conveyors.
Hercules Inc., New Ways to Engineer with 1900 UHMW Polymer.

Primary Examiner—Joseph E. Valenza
Assistant Examiner—Kyle E. Shane
Attorney, Agent, or Firm—Louis T. Isaf

[57] ABSTRACT

An idler roll assembly comprises a unitary, solid roller formed essentially of ultra-high molecular weight high-density polyethylene resin mounted without separate bearing components for rotation on a shaft member and also for movement about the shaft member within allowed tolerances and boundaries, to provide a maintenance free roller assembly which also assists in improved operation of systems of which the roller assembly is a component part.

1 Claim, 4 Drawing Figures

IDLER ROLL ASSEMBLY

BACKGROUND OF THE INVENTION

This invention relates generally to an improvement in roller and roller assemblies for use in idler systems such as belt conveyer idler systems.

Conveyer manufacturers are presently constructing idlers (for example, transporting idlers, troughing idlers, return idlers, and impact idlers) using steel or rubber rollers or plastic shells, each of which makes use of lubricated balls or roller bearings. The prior art designs are typically hollow in design rather than solid, or, in some cases, the roller is constructed of a solid shell portion with a foam innercore. Examples of some prior art idler rollers and roller assemblies are found in the following U.S. Pat. Nos.: 3,406,438—D. C. Reilly; 3,711,912—F. Teske et al; 3,888,131—C. M. Reid; and 4,440,295—P. J. Blackwood-Murray. The patent to Reilly shows a plastic-metal belt conveyer roller assembly. The roller appears to be hollow with a rigid, plastic shell, such as polyvinyl chloride. The Blackwood-Murray patent discloses an idler roller having an impact resistant synthetic plastic shell and a foam core. The Reid invention does not necessarily refer to rollers themselves but to a covering for idler rollers; the Reid covering being made preferrably of polyurethane elastomer. Teske appears to teach a roller constructed of a central core made of foam polyurethane and a hard casing made of cross-linked polyurethane.

In addition to the prevalent, shell type designs of the prior art, the roller assemblies of the prior art designs are outfitted with lubricated ball or roller bearings.

These known prior art roller assemblies are given to certain maintenance problems. All of the rollers require lubrication and maintenance of grease seals; such frequent lubrication resulting in high maintenance costs. Grease leakage due to over-lubrication or worn grease seals provides glue for stickage of conveyed material which results in buildup and impairs the rotation of rollers. Rollers lock-up due to material contamination of highly precision bearings; such lock-up resulting in holes being worn in the idler rolls by the continuously moving belt, which in turn also damages the conveyer belt. Rust and corrosion of metal components is a problem for prior art systems used outdoors. Furthermore, due to the relatively narrow thickness of the outer shells, conventional rollers tend to wear fast.

SUMMARY OF THE INVENTION

Briefly described, the present invention teaches an idler roll assembly which comprises a solid roller made of ultra-high molecular weight high density polyethylene resin; which roller is mounted without the use of separate bearings on a shaft (axis). The shaft extends through an axial hole in the solid roller, where the roller and shaft are in direct contact with one another. There is a certain amount of tolerance between the shaft diameter and the roller passage diameter to prevent binding. The polyethylene material is its own bearing surface removing the requirement for independent bearing components. Gaskets and seal caps are provided to prevent the entry of foreign objects into the roller passage between the roller and shaft.

Preferably, the ultra-high molecular weight high density polyethylene resin used in the present invention has inherent lubricity, is highly abrasive and resistant, highly chemical resistant, and highly radiation resistant. The rollers of the present invention maintain their physical and mechanical properties over a wide temperature range (ie.—450 to 200 F.); they will not oxidize or rust. An example of the polyethylene utilized is that known as "1900 ®UHMW POLYMER" manufactured and sold by Hercules Incorporated of Wilmington, Del.

It is, therefore, an object of the present invention to provide an idler roll assembly comprising a unitary, solid roller formed essentially of ultra-high molecular weight high-density polyethylene resin mounted without separate bearing components for rotation on a shaft member and also for movement about the shaft member within allowed tolerances and boundaries, to provide a maintenance free roller assembly which also assists in improved operation of systems of which the roller assembly is a component part.

Another object of the present invention to provide an idler roll assembly which is made simply, relatively inexpensive, and relatively maintenance free with a minimum of assembly components.

Another object of the present invention is to provide a unique, idler roll assembly which requires no grease, thus eliminating the possibility of contamination from the idler of conveyed products.

Still another object of the present invention is to provide an idler roll assembly which minimizes the possibility of corrosion of component parts, minimizes the possibility of roller lock-up.

Yet another object of the present invention is to provide an idler roll assembly which is weather and chemical resistant.

Other objects, features and advantages of the present invention will become apparent upon reading and understanding the remaining specification, when taken in conjunction with the accompanying drawings.

DETAILED DESCRIPTION OF THE DRAWINGS

Figure 1:
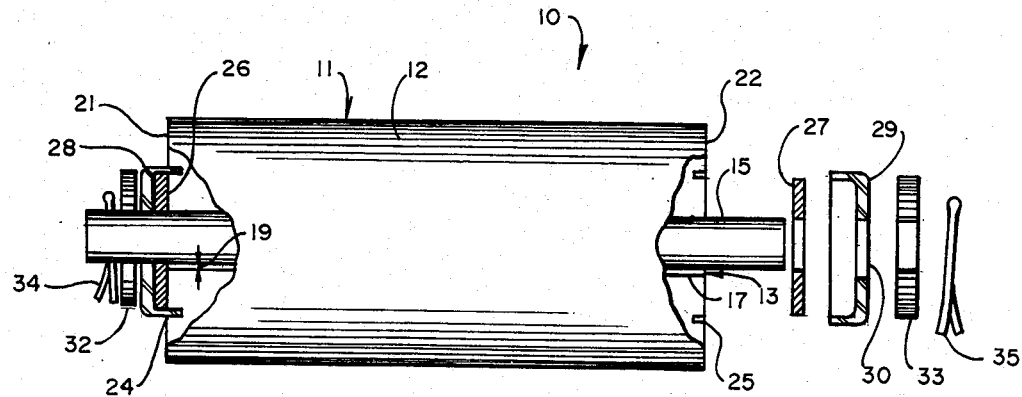
FIG. 1 is a partially cut-away, partially exploded front view of the improved idler roll assembly in accordance with the present invention.

Referring now in greater detail to the drawings in which like numerals represent like components throughout the several views, FIG. 1 shows the idler roll assembly 10 in accordance with the present invention. The roll assembly 10 comprises a solid roller 11. The roller 11 is a unitary, solid piece of material formed in the shape of a cylinder through which a central, axial bore or passage 13 has been defined. The central passage 13 is itself cylindrical and concentric with the outer periphery 12 of the roller 11, and extends through the entire length of the roller. The entire roller 11, including the exposed outer periphery 12 and the inner periphery 17 which forms the walls 17 of the passage 13, is a solid piece of material. Preferably, the roller 11 is formed of an ultra-high molecular weight high-density polyethylene resin having a molecular weight range between three and six million. In the preferred embodiment, the roller is highly abrasive, wear resistent, highly impact resistent, highly chemical and radiation resistent. An example of the type of material described herein from which the roller 11 is formed, is that material sold by Hercules Corporation of Wilmington, DE., under the Trademark 1900®UHMW Polymer.

Figure 2:
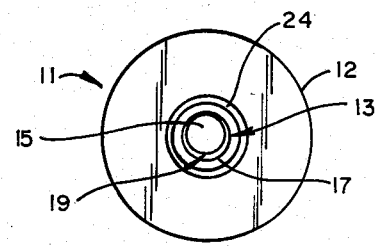
FIG. 2 is a left end view of the roller component of the idler roll assembly of FIG. 1.

A shaft member 15 extends axially through the roller passage 13. The shaft member 15 is itself cylindrical and, in the preferred embodiments, the outside diameter of the shaft member 15 is in the range of six percent (6%) to twenty-eight percent (28%) smaller than the inside diameter of the roller 11; that is, six percent (6%) to twenty-eight percent (28%) smaller than the diameter of the central passage 13. There are no bearings or other rotation assisting components used in conjunction with the roller 11 and shaft member 15. Rather, the roller 11 rests directly on the shaft member 15 with direct material-to-material contact being made throughout the length of the central passage 13 between the shaft member 15 and the wall 17 of the passage (that is, the inner periphery of the roller 11). As seen in FIGS. 1 and 2, since the shaft member 15 is not set rigidly within the passage 13 by bearings and other roller and shim materials, the shaft member and passage are not oriented exactly concentric. Rather, contact is made along the upper most surfaces of the shaft member 15 and passage 13 as the roller rotates about the shaft; and a gap 19, relating to the difference in diameters between the shaft member and passage, results at the lower most points of the shaft and passage. The roller sets loosely on the shaft and moves perpendicular to the axis of the shaft as allowed by the gap 19 clearance.

As seen in FIG. 1, the left end 21 and right end 22 of the roller 11 are each formed with an annular grove 24, 25 cut into the respective end. The annular grove 24, 25 is concentric with the outer periphery 12 and inner periphery (passage) 17 of the roller 11. A tight fitting, washer-shaped gasket member 26, 27 is fit tightly over each end of the shaft member 15. A seal cup 28, 29 is then slid over each end of the shaft member 15 to the outside of the gasket member 26, 27 and the seal cup is tightly, press fitted into the respective annular grove 24, 25 to form a dust seal about the roller passage 13. The respective annular grove 24, 25, gasket member 26, 27 and seal sup 28, 29 comprise a dust seal assembly which prevents the entry and buildup of particles between the shaft member 15 and roller 11 through the passage 13. In the preferred embodiment, the gasket members 26, 27 are made of pure gum rubber and the seal cups 28, 29 are made of stainless steel. The inside diameter 30 of each seal cup 28, 29 is sufficiently large to allow movement of the shaft member 15 within the roller passage 13. The gasket members 26, 27, however, are made of sufficiently resilient material such that the gaskets hug tightly to the shaft member regardless of the up and down movement of the roller 11 on the shaft member.

A retention washer 32, 33 is placed on each end of the shaft member 15 and held in place by a cotter-pin 34, 35. Since there are no bearings or other components holding the roller fast to the shaft member, the roller is capable of moving along the shaft, parallel to the axis of the shaft, within the bounds of the retention washers and cotter-pins.

Figure 3:
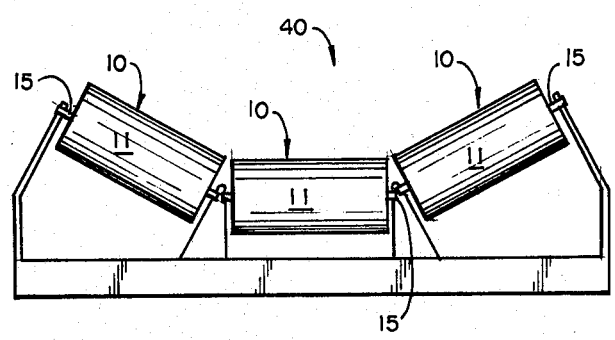
FIG. 3 is a front view of a troughing roller system assembly utilizing three idler roll assemblies of the present invention.
Figure 4:
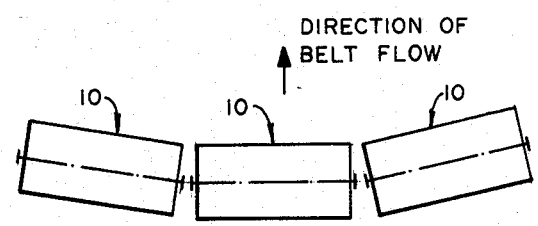
FIG. 4 is a top view of the system assembly of FIG. 3.

FIGS. 3 and 4 show the orientation of three idler roll assemblies 10 in accordance with the present invention, placed for use as a troughing roller system assembly 40, as known in the industry. FIG. 3 is a frontal view, seen parallel to the direction of movement of a conveyer belt. FIG. 4 is a top view as seen looking down perpendicular to an associated conveyer belt. It is noted that the roll assemblies 10 are not colinear in their top-view profile (FIG. 4) as well as their front view profile (FIG. 3). As an added feature of the present invention, the non-linear orientation of the roller assemblies 10, in the troughing assembly 40 arrangement of FIGS. 3 and 4, taken together with the feature of the present invention which allows movement of the roller 11 along the length of the shaft member 15, provides assistance in maintaining the tracking (troughing) of the conveyor belt as it moves along the troughing assembly 40.

While this invention has been described with particular reference to preferred embodiments thereof, it will be understood that variations and modifications can be effected within the spirit and the scope of the invention as described herein and as defined in the appended claims.

What is claimed is:

1. An idler roll assembly, comprising:

elongated shaft member;

a single, elongated cylindrical roller mounted on said shaft member, said cylindrical roller defining an outer peripheral surface, a left end wall, a right end wall and an inner peripheral surface, said inner peripheral surface defining a cylindrical passage of uniform diameter throughout extending the full length of the said roller from end wall to end wall; said roller, including said outer peripheral surface and said inner peripheral surface, comprising a solid unit formed of ultra-high molecular weight high density polyethylene resin;

said shaft member extending through said cylindrical passage of said roller and protruding from both ends of said roller, said roller being rotatable about said shaft member, as about an axle; said shaft member making direct contact with said inner peripheral surface of said roller throughout the entire length of said passage;

said cylindrical passage of said roller defining on inside diameter ranging from six percent (6%) to twenty-eight percent (28%) greater than the outside diameter of said shaft member; and retention means held on each end of said shaft member for retaining said shaft member within said passage of said roller, whereby said roller rotates about said shaft member without the presence of added bearing, bushings or lubricants; and a seal assembly located at each end of said shaft member for sealing entry to said passage of said roller, said seal assembly comprising a flexible gasket member fitting tightly about said shaft member at each end of said shaft member, an annular groove formed in each end wall of said roller circumscribing the opening to said passage, a rigid seal cup press fitted into each annular groove holding said gasket members pressed against the respective said end walls, each said seal cup comprising a central opening through which said shaft member protrudes, said central opening defining an inside diameter sufficiently greater than the diameter of said shaft member to allow up-and-down movement of said shaft member within said central opening, whereby said shaft member and one of said gasket members combine to seal each opening of the roller passage.

* * * * *